United States Patent [19]

Bock et al.

[11] Patent Number: 4,612,332

[45] Date of Patent: Sep. 16, 1986

[54] NOVEL POLYMERIC FOAMS AND FOAMING COMPOSITIONS

[75] Inventors: Jan Bock, Bridgewater; Hartley H. Downs, Annandale; Donald B. Siano, Lebanon; Salvatore J. Pace, Glen Gardner, all of N.J.

[73] Assignee: Exxon Research and Engineering Co., Florham Park, N.J.

[21] Appl. No.: 808,035

[22] Filed: Dec. 12, 1985

[51] Int. Cl.[4] ................................................. C08J 9/30
[52] U.S. Cl. .......................................... 521/65; 521/72; 521/149
[58] Field of Search .............................. 521/65, 72, 149

[56] References Cited

U.S. PATENT DOCUMENTS

| | | | |
|---|---|---|---|
| 3,032,516 | 5/1962 | Burkhard et al. | 521/65 |
| 3,577,554 | 5/1971 | Parrish et al. | 521/65 |
| 3,663,462 | 5/1972 | Arndt et al. | 521/65 |
| 3,714,078 | 1/1973 | Gordon et al. | 521/65 |
| 3,931,086 | 1/1976 | Lindemann | 521/65 |
| 4,353,993 | 10/1982 | McCrossin | 521/65 |
| 4,417,016 | 11/1983 | Cline et al. | 521/65 |

*Primary Examiner*—Morton Foelak
*Attorney, Agent, or Firm*—Richard E. Nanfeldt

[57] ABSTRACT

Surfactant-free stable aqueous foams may be produced by water soluble copolymers of acrylamide and N-alkylacrylamide with chain lengths greater than or equal to 6 carbons. Additionally, these polymers may contain an anionic monomer, such as a monovalent salt of acrylic acid. These copolymers and terpolymers are added to water or brine at a concentration of 0.005 to 2 parts per 100 of solvent. When the resulting solutions are subjected to intensive mixing with the addition of air or other gases, such as nitrogen or carbon dioxide, high quality, persistent foams are formed. These foams are formed at relatively low polymer concentrations without added surfactants. They have good high temperature stability and excellent salt tolerance.

11 Claims, No Drawings

NOVEL POLYMERIC FOAMS AND FOAMING COMPOSITIONS

BACKGROUND OF THE INVENTION

1. Field of the Invention

Stable and persistent foams have been found which are based on water soluble polymers containing a small amount of oil soluble or hydrophobic groups. Copolymers of acrylamide and a water insoluble N-alkylacrylamide and terpolymers of acrylamide, a monovalent salt of acrylic acid and a water insoluble N-alkylacrylamide when added to water, which may contain electrolytes, and blended with a gas, such as air, nitrogen or carbon dioxide, forms very stable foams at extremely low polymer concentrations. Surprisingly, these polymers do not reduce surface tension like conventional surfactants and do not require any surfactant to form very tenacious and persistent foams. In contrast with conventional surfactants, foaming tendencies increase with increasing temperature. Thus, foams prepared from the novel polymeric foaming agents of this invention are distinguished by their high temperature stability and long term persistence.

2. Description of the Prior Art

A foam is a dispersion of a gas in a liquid with an extremely high dispersed phase volume, such that the system can essentially be regarded as a network of interconnected liquid films (J. J. Bikerman, *Ind. Chem.*, 57, 56 [1965]). Foams find a variety of useful applications, including fire fighting (J. M. Perri in "Foams: Theory and Industrial Applications", J. J. Bikerman, Ed., Reinhold Publishing Corp., NY, 1953, Chapter 12), foam fracturing of petroleum reservoirs to improve oil recovery (M. W. Conway and L. R. Norman, U. S. Pat. No. 4,453,596), soil cleanup or detergency (J. J. Bikerman, "Foams"; Springer-Verlag Publishers, NY, 1973, page 254) froth flotation in minerals processing (R. B. Booth in "Foams: Theory and Industrial Applications", J. J. Bikerman, Ed., Reinhold Publishing Corp., NY, 1953, Chapter 13) and mobility control in miscible (D. C. Bond and O. C. Holbrook, U.S. Pat. No. 2,866,507) and thermal oil recovery (W. E. Brigham, O. P. Malito and S. K. Sanyal, "A Field Experiement of Steam Drive with In-Situ Foaming", DOE Report No. DOW/SF/11445-2 [1984]).

Foams are usually made by the use of surface active agents which concentrate at gas-liquid interfaces and reduce surface tension. The selection of surfactants and conditions for optimum formation and stabilization of foams is one mainly of art. Classes of surfactants which enable aqueous foams to form include alkyl sulfates (K. G. A. Pankhurst, *Trans. Faraday Soc.*, 37, 496 [1941]) (such as sodium dodecylsulfate), alkyl ether sulfates (E. Gotte, 3rd World Congress Surface Active Agents, Cologne, 1969, 1, 45 [1962]) (such as Alipal CD-128), alkyl ethoxylates (W. B. Satkowski, S. K. Huang and R. L. Liss in "Nonionic Surfactants", M. J. Schick, Ed., Marcel Dekker Publishers, NY, 1966, Chapter 4) (such as Neodol 25-9), alkyl aryl ethoxylates (C. R. Enyeart in "Nonionic Surfactants", M. J. Schick, Ed., Marcel Dekker Publishers, 1966, Chapter 3) (such as Igepal CO-730). Also, certain classes of proteins (such as serum albumin and $\beta$-casein) (D. E. Graham and M. C. Phillips in "Foams", R. J. Akers, Ed., Academic Press, NY 1976, Chapter 15) enable foams to form. Foam begins to form only when surfactants are present in concentrations near or above their critical micelle concentration (CMC) and the surface tension of the liquid phase has been significantly reduced. For example, the surface tension of aqueous solutions must be reduced from 72 dynes/cm to about 35 dynes/cm by addition of at least 0.01 parts Alipal CD-128 (CMC=0.03 weight percent) per 100 parts water, or by addition of at least 0.001 parts Neodol 25-9 (CMC=0.002 weight percent) per 100 parts water before foams can form.

The amount of gas which can be dispersed in the liquid phase to form a foam depends not only on the surfactant concentration and type, but also on the salinity and temperature of the system (J. J. Bikerman, "Foams", Springer-Verlag Publishers, NY, 1973). As either temperature or the salt content of the aqueous phase increase, the amount of gas which can be dispersed in the aqueous phase decreases. For example, at 25° C. the amount of gas which can be dispersed in aqueous solutions containing 0.03 parts Neodol 25-9 per 100 parts water decreases by 50% at the salinity of the aqueous phase increases from 0 to 10 parts NaCl per 100 parts water. As the temperature increases from 25° C. to 49° C., the amount of gas which can be dispersed in deionized water decreases by 22%. Thus, foams prepared with conventional surfactants are sensitive to temperature and salinity conditions which limit their usefulness in many applications. While reduced surface tension enables foam films to form, a separate mechanism is sometimes needed to stabilize these films. Thus, protein gums and cellulosics have been suggested (J.J. Bikerman, "Foams", Springer-Verlag Publishers, NY, 1973, page 240) as additives which enhance the persistence of foams made with surfactants. While these approaches provide stable foams under a limited set of conditions, it is difficult to form stable foams under conditions such as high temperature or high salinity, which reduce the viscosification efficiency of these additives. Relatively high concentrations of these additives are needed to significantly increase foam stability. Furthermore, these two component packages may be costly and difficult to formulate.

Any of several methods can be used to disperse a gas into a properly formulated liquid phase to form a foam (J. J. Bikerman, "Foams: Theory and Industrial Applications", Reinhold Publishers, NY, 1953, Chapter 1). Gas may be bubbled into the liquid phase. Gas and liquid phases can be coinjected through certain types of nozzles or separately injected through opposing nozzles (for example, H. B. Peterson, R. R. Neill and E. J. Jablonski, *Ind. Eng. Chem.*, 48, 2031 [1956]). Gas can be mixed into the liquid phase within high shear devices, such as blenders (for example, as described in ASTM D3519-76, 1982, "Foam In Aqueous Media [Blender Test]"). Foams can be made when gas is dispersed into a properly formulated liquid phase by splashing (such as in the Ross-Miles Test, described in ASTM D1173-53, 1953, "Foaming Properties of Surface Active Agents") or by shaking. Foams can also be produced by reducing the pressure on a liquid phase which initially contains dissolved gas; when the pressure is reduced below the bubble point of the mixture a separate gas phase can begin to form and, thereby, produce a foam. These methods differ in the amount of gas which can be dispersed into the liquid phase; however, for a single method (e.g., ASTM D1173-53) the volume of gas which is dispersed into the liquid phase can be used as a measure of the relative foam formation and foam stability characteristics of different systems.

While polymers have been previously used in conjunction with surfactants to produce stable foams, there appears to be little use made of high molecular weight water soluble polymers for foaming water or brine in the absence of surfactants. A class of polymers, the subject of this invention, have been found to be efficient foam producers and stabilizers at low concentrations and at elevated temperatures. These polymers are disclosed in U.S. Pat. No. 4,520,182 and processes for synthesizing them were described in U.S. Pat. Nos. 4,528,348 and 4,521,580 and in copending applications attorney docket numbers C-1513 and C-1935, which are hereby incorporated by way of reference. They consist predominantly of acrylamide copolymerized with small amounts of a hydrophobic monomer, such as octylacrylamide, and are designated as "RAM" copolymers. When partially hydrolyzed by the use of alkali base to produce copolymers of metal salts of acrylic acid they are designated as "HRAM" copolymers. They have high molecular weights and are also relatively efficient viscosifiers of water and brine.

SUMMARY OF THE INVENTION

Surfactant-free stable aqueous foams are produced by water soluble copolymers of acrylamide and N-alkylacrylamide with chain lengths greater than or equal to 6 carbons. Additionally, these polymers may contain an anionic monomer, such as a monovalent salt of acrylic acid. These copolymers and terpolymers are added to water or brine at a concentration of 0.005 to two parts per 100 of solvent. When the resulting solutions are subjected to intensive mixing with the addition of air or other gases, such as nitrogen or carbon dioxide, high quality persistent foams are formed. They are formed at relatively low polymer concentration without added surfactants. They have good high temperature stability and excellent salt tolerance.

DETAILED DESCRIPTION OF THE INVENTION

In accordance with the present invention, substantially surfactant-free foams can be produced from aqueous or brine solutions containing a low concentration of one of a class of water soluble polymers by injecting or mixing air or other gas into it. These foams have good stability at elevated temperature and are very tolerant of high concentrations of salt or water hardness ions.

The foaming agents used in this invention are copolymers of acrylamide and an alkylacrylamide, and terpolymers of acrylamide, alkylacrylamide and salts of acrylic acid, characterized by the formula:

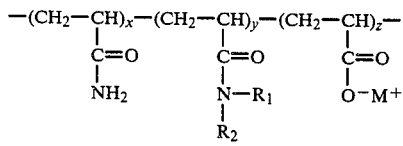

wherein $R_1$ is preferably a $C_6$ to $C_{22}$ straight chain or branched alkyl or cycloalkyl group, more preferably $C_6$ to $C_{20}$, and most preferably $C_6$ to $C_{18}$; $R_2$ is the same or different alkyl group as $R_1$ or hydrogen; and $M^+$ is an alkali metal or ammonium ion. The mole fraction of acrylamide, x, is preferably about 0.50 to about 0.999, more preferably about 0.60 to about 0.995, and most preferably 0.70 to about 0.995. The mole fraction of alkylacrylamide, y, is preferably about 0.001 to about 0.10, more preferably about 0.002 to about 0.05, and most preferably about 0.003 to about 0.03. The mole fraction of acrylic acid salt, z, is preferably about 0.0 to about 0.5, more preferably about 0.0 to about 0.4, and most preferably 0.0 to about 0.3.

The copolymers used in this invention may be synthesized by either of two processes. Both of the processes rely on dispersing the water insoluble monomer on a very fine scale so that effective copolymerization with the water soluble monomer can be effected. These processes both utilize surfactants in combination with the other components, from which the polymer is separated after completion of the polymerization in order to give a product that is substantially free of surfactant, as well as microgel or particulates of insoluble polymer.

The microemulsion processes, described in U.S. Pat. No. 4,528,580, "Microemulsion Process for Producing Acrylamide-Alkylacrylamide Copolymers", carry out the dispersion of the water insoluble monomer by solubilizing it in a microemulsion consisting of very small droplets of hydrocarbon, surfactant and cosurfactant dispersed in the predominantly aqueous phase. In this process the acrylamide is dissolved together with the water soluble initiator into the aqueous phase which also contains dispersed in it the microemulsion droplets which are sufficiently small to give the appearance of a clear, homogeneous, isotropic mixture free of visible droplets or particulates of the water insoluble monomer.

The micellar process, described in U.S. Pat. No. 4,528,348, "Micellar Process for Producing Acrylamide-Alkylacrylamide Copolymers", attains the same objective by the use of a single surfactant in an amount sufficient to solubilize all of the water insoluble monomer so that the resulting solution is isotropic, clear and free of visible particulates or droplets. The surfactant chosen must be capable of a relatively high solubilizing capacity for the water insoluble monomer without, at the same time, interfering with the course of the polymerization by, for example, acting on a strong chain transfer agent. A suitable surfactant is sodium dodecyl sulfate, which is readily available in high purity.

The initiator used in either case is a water soluble free radical initiator or a suitable oxidation-reduction pair, many examples of which are well known to those versed in the art. Examples are alkali or ammonium persulfate, hydrogen peroxide and sodium bisulfite. The concentration of the free radical initiator is about 0.01 to 0.50 grams per 100 grams of acrylamide and alkylacrylamide monomer. The polymerization is conducted in the substantial absence of oxygen at a temperature which depends upon the initiator chosen and molecular weight desired. The temperature used is preferably about 20° C. to about 90° C., more preferably about 25° C. to about 80° C., and most preferably about 30° C. to about 70° C.

The resulting terpolymer of acrylamide, a salt of acrylic acid and a hydrophobic N-alkylacrylamide can be isolated from the reaction mixture by any one of a variety of techniques which are well known to one skilled in the art. For example, the polymer may be recovered by precipitation using a non-solvent, such as acetone, methanol, isopropanol or mixtures thereof. The precipitated polymer can then be washed and oven dried to provide a substantially surfactant-free product in the form of a free flowing powder. Alternatively, the polymer solution may be used as is by dilution with the desired aqueous solvent to the concentration of use.

The copolymers were in some instances also post-reacted with a solution of sodium hydroxide in order to hydrolyze some of the acrylamide to a sodium salt of acrylic acid. A description of the process used is given in copending applications attorney docket numbers C-1513 and C-1935. When the starting polymer contained no alkylacrylamide (PAM) the partially hydrolyzed polymer is designated as an HPAM. When the starting polymer contained some alkylacrylamide (RAM) the corresponding partially hydrolyzed polymer is designated as an HRAM. In the production of the HRAM and HPAM polymers the hydrolysis was carried out at 50° C. at a polymer concentration of 3% and a concentration of sodium hydroxide was used that was calculated to give a certain desired degree of hydrolysis. This was subsequently measured by potentiometric titration after the isolation of the polymer.

The molecular weight of these polymers ranged from about 500,000 to about 10,000,000 g/mole, depending upon details of the synthesis condition under which they were made. For example, a lower molecular weight polymer may be made by increasing the amount of initiator in the polymerization or by the addition of some chain transfer agent, such as isopropyl alcohol. Conversely, higher molecular weight polymers may be made by decreasing the amount of initiator or by lowering the reaction temperature.

The amount of surfactant remaining in the polymer after the isolation step may be determined by the use of a color test. It involves the solubilization of a methylene blue complex with the surfactant which is extracted into chloroform, where it is detected spectrophotometrically. A stock solution of methylene blue (Aldrich Chemical Co.) at a concentration of 0.26 mM in water is used for the test, which is carried out in a 15 ml capped vial (12×100 mm). One ml of this stock solution is added to 0.5 ml of solution of the surfactant or surfactant-containing polymer solution, which is adjusted to a concentration of about 0.001 mM to about 0.25 mM of sodium dodecylsulfate. Ten ml of chloroform is added to this and the mixture is turned end for end at 12 rpm for 3 minutes by means of a rotating mixing apparatus.

The tube is then centrifuged at 2,500 rpm for 10 minutes using a Dynac II centrifuge with a 0113 angle rotor for twelve 15 ml tubes. The chloroform layer is carefully sampled by the use of a Pasteur pipette and placed in a 1×1 cm cuvette. A blank control sample which contains no sodium dodecylsulfate is also made up and treated in exactly the same way at the same time to serve as a reference solvent in the spectrophotometer. The absorbance of the solution at 605 nm is measured against the blank and compared to a calibration curve that is constructed using known concentrations of surfactant in the usual way.

The process of producing the polymeric foam comprises two steps. The first step comprises dissolving the previously described copolymers in water or an aqueous salt solution wherein the concentration of the copolymer is about 0.005 to about 5.0 parts by weight per 100 parts by weight of water, more preferably about 0.01 to about 3.0 parts per 100 parts by weight of water, and most preferably about 0.02 to about 2.0 parts per 100 parts by weight of water. In the second step gas is dispersed into the liquid phase which contains the dissolved copolymer. Methods which can be used to disperse gas into the liquid phase include, but are not limited to, the methods previously described.

Lowering of surface tension of aqueous solutions from 72 dynes/cm is a necessary but insufficient condition for foam formation with conventional foamers. The surface tension of aqueous solutions containing the disclosed polymers was determined by the du Nouy Method (described in ASTM D1131-56, "Standard Test Methods for Surface and Interfacial Tension of Solutions of Surface-Active Agents"). After the surface tensiometer was leveled and calibrated with ultra-pure water the aqueous polymer solution was placed in a thoroughly cleaned vessel on the sample platform of the tensiometer. A cleaned platinum du Nouy ring, 4.0 cm in diameter, was submerged below the air/aqueous polymer solution interface by raising the sample platform. The platform was then slowly lowered, while tension was applied to the wire by means of the dial-adjusting screw. These simultaneous adjustments were carefully porportioned so that the ring system remained constantly in its zero position. As the breaking point was approached the adjustments were made more carefully and more slowly. The surface tension was determined from the dial reading at the instant the ring detached from the surface. At least 2 measurements were made at 25° C. for each system.

Measurement of the dilute solution viscosity can be made with conventional Couette or capillary viscometers. For the Examples given below, a Contraves low shear viscometer, Model LS-30, together with a No. 1 cup and No. 1 bob were used. Temperatures were controlled to ±0.1° C. and measurements were made at a rotational speed corresponding to the desired shear rate. In contrast to conventional water soluble polymers, the polymers often exhibit long relaxation times under shear, so relatively long measurement times were employed to give equilibrium shear stresses.

The foam formation and stability characteristics of aqueous solutions containing the disclosed polymers were determined by the Ross-Miles Test (ASTM D1173-53). A foam pipet was charged with 200 cc of the aqueous polymer solution, while the 5.0 cm ID foam receiver was filled with 50 cc of the same solution. After centering the pipet about the foam receiver the aqueous solution in the pipet was allowed to drain 90 cm through air and splash into the solution in the foam receiver, thereby forming a foam. The height of the foam layer, a measure of the volume of air which was incorporated into the foam, was recorded as a function of time. At least two determinations were made for each additive system at the specified temperature. The initial height of the foam layer is a measure of the relative foam formation tendency of the additives and the rate at which the foam layer decays is a measure of the stability of the resulting foam. Thus, different additives can be characterized in this test by the initial foam height and by the time rate of change in foam height.

DESCRIPTION OF THE PREFERRED EMBODIMENTS

The following Examples explain the invention, which are by way of illustration but not of limitation.

EXAMPLE 1

Polymers for Preparing Aqueous Foams

Four polymers were prepared in 5 liter resin kettles equipped with turbine impellers. To 2,425 grams of distilled water in each vessel 75 grams of recrystallized acrylamide and 80 grams of sodium dodecylsulfate were added. In two of the vessels 2 grams of N-n-octylacrylamide was added. The reaction mixtures were all brought to 50° C., purged with nitrogen for 1 hour and initiated with 0.05 gram of $K_2S_2O_8$. After 24 hours of reaction one run with and without N-n-octylacrylamide were isolated by precipitating in acetone. These polymers are referred to as RAM-313X and PAM-310X, respectively. The polymers in the remaining runs were hydrolyzed by adding 0.40 moles of NaOH to the reaction mixture and mixing for 90 minutes. The resulting hydrolyzed polymers, with and without N-n-octylacrylamide, were isolated by precipitating in acetone. These polymers are referred to as HRAM-317X and HPAM-316X, respectively.

EXAMPLE 2

Polymer Solution Properties

The pertinent solution properties of the polymers described in Example 1 are given in Table I. As shown, the surface tension measured by the du Nouy Ring Method (ASTM D1131-56) was essentially independent of polymer type or concentration and was not measurably different from the surface tension of pure water (72 dynes/cm). In comparison, surface tension of aqueous solutions containing the same concentration (i.e., 2,000 ppm) of surfactant were significantly lower than that of pure water. For example, the surface tension of a 2,000 ppm solution of Alipal CD-128 in deionized water is 31 dynes/cm and the surface tension of a 2,000 ppm solution of Neodol 25-9 in deionized water is 32 dynes/cm. If the mechanism for forming foam is surface tension lowering, then these polymer solutions would not be expected to form foams.

As shown in Table I, the solution viscosity of 2,000 ppm solutions of the polymers were significantly different from that of pure water which has a viscosity of about 0.9 cP.. The nonionic polymers (e.g., 313X) have a viscosity about an order of magnitude greater than water, while the ionic polymers (for example, 317X and 316X) have over two orders of magnitude greater viscosity. This is due to chain expansion caused by charge repulsion of the anionic groups along the polymer backbone. Thus, if solution viscosity controlled foam formation, one would anticipate that solutions of the HPAM (316X) would be the best foamers. This is not the case, as well be shown by Example 3.

EXAMPLE 3

Foam Formation Behavior

Foam formation and persistence characteristics of the polymer solutions were determined using the Ross-Miles Test (ASTM D1173-53). In this test a foam pipet was charged with 200 cc of the polymer solution prepared in Example 1 and having the solution properties discussed in Example 2. A 5.0 cm ID foam receiver was partially filled with 50 cc of the same solution. After centering the pipet above the foam receiver, the surfactant solution was allowed to drain out of the pipet through 90 cm of air into the solution in the bottom of the foam receiver. Foam was produced by splashing. The height of the resulting foam was measured as a function of time.

As shown in Table II, the foam height was significant for the polymers containing hydrophobic groups, particularly when compared to the polymer of similar structure but without the hydrophobe. The nonionic hydrophobic polymer (313X) also appears to have greater foam forming tendencies than the partially hydrolyzed version (317X). This is in contrast to the expectation that the more viscous solution should produce more foam if solution viscosity is the mechanism which controls foam formation.

Quite unexpectedly, the foam height actually increases for the hydrophobically associating polymers with increasing temperature and salinity. As shown in Table II, the foam heights almost doubled in going from room temperature to 49° C. Furthermore, in most cases, foam heights almost doubled by increasing the salinity from 0.0 weight percent NaCl to 2.0 weight percent NaCl (Table III). This behavior is quite unusual and would not be expected when foaming with ordinary surfactants.

A second property of the foams is the persistence, which is defined as the foam height as a function of time normalized to the foam height at time zero. As shown in Table IV, foams made with the hydrophobically associating polymers were considerably more stable than those made with conventional surfactants, such as Alipal CD-128 and Neodol 25-9. All of the measurements were made with 0.2 weight percent additive at a temperature of 49° C.

EXAMPLE 4

Comparative Foam Tests

In this test several copolymers of acrylamide and octylacrylamide were compared in foaming characteristics by bubbling nitrogen gas at a low flow rate through a column of solution of the copolymers. The polymer concentration was 1,000 ppm in a 2 weight percent solution of sodium chloride. Seventy-five ml of solution was contained in 150 ml plastic graduated cylinder fitted with a tube that reached to the bottom of the solution, at the end of which was a porous plug through which the nitrogen was bubbled for 2 minutes. The foam height at 30 seconds and 5 minutes was measured to determine the foaming characteristics.

The results are shown in Table V. Two PAM's were used. As indicated in the Table, the first one was synthesized in the absence of any surfactant so it could not contain any residual surfactant. The second PAM was synthesized under identical conditions, except that a surfactant, sodium dodecylsulfate, was present at a concentration of 3 weight percent. Both polyacrylamides were isolated by the same procedure of reprecipitation with acetone. In both cases the height of the column of foam was 0.0 cm at both times. The same result was found using a commercially available sample of an HPAM from Dow Chemical Co., called Pusher 700 ®.

In contrast to these results on polymers not having a hydrophobic component, four samples of different octylacrylamide-containing polymers all produced very significant levels of foam, which persisted at least for 5 minutes. The polymers used were synthesized with varying mole percents of octylacrylamide used in the polymerization (based on the total number of moles of monomer) which is indicated in the second column of Table V. The polymerization conditions were identical to those used for the two PAM's, which shows that the foaming characteristics of these polymers was due to the presence of the octylacrylamide in the copolymer.

In a few of the cases, the polymers were checked for the presence of surfactant by a colorimetric test using methylene blue dye. The amount of surfactant detected in the polymers is given in Table V and was found to be only a few parts per thousand of the polymer. Therefore, because the polymer was in solution at a level of 1,000 ppm, only a few ppm of surfactant was present in the polymer solution. This is not enough surfactant to cause appreciable foaming. A separate test involving the foaming of a solution of sodium dodecylsulfate at a concentration of 4 ppm gave the result of zero foam height at 30 seconds and 5 minutes under identical conditions. This control experiment, therefore, proves that the foaming tendencies of the octylacrylamide-containing polymer must be ascribed to the composition of the polymer, rather than to the presence of contaminating surfactant left over from the polymerization.

EXAMPLE 5

Foam Test for Various Water Soluble Polymers

Various commercially available water soluble homopolymers were studied under conditions identical to those in Example 4. The results are shown in Table VI. None of the polymers had any foam at all at 5 minutes and only one of them had any foam at 30 seconds. Comparing these results with those in Table V shows that the foaming characteristics of the acrylamide-alkylacrylamide copolymers is not a general characteristic of high molecular weight water soluble polymers.

These Examples illustrate that solutions of acrylamide-alkylacrylamide copolymers and terpolymers containing salts of acrylic acid form very persistent foams. These foam forming tendencies were unexpected since aqueous solutions of other classes of polymers do not form foams. Furthermore, while surface tension lowering and high solution viscosity are the mechanisms by which surfactant-stabilized foams are formed, neither mechanism can account for the observed foam forming characteristics of solutions of acrylamide-alkylacyrlamide copolymers. Foams made from solutions of acrylamide-alkylacrylamide copolymers have unique properties. While the foam forming capacity of surfactant solutions generally decreases with increasing temperature and salinity, the foam forming capacity of solutions of acrylamide-alkylacrylamide copolymers generally increase with increasing temperature and salinity. In addition, the Examples illustrated that foams of the claimed polymers are far more persistent than surfactant-stabilized foams.

TABLE I

COMPOSITION AND PROPERTIES OF FOAMING POLYMER SOLUTIONS

| Polymer Type | % C8 | % Hydrolysis | Surface Tension[1] Dynes/cm | Viscosity[2], cp $1.3^{s-1}$ | $11^{s-1}$ | $20^{s-1}$ |
|---|---|---|---|---|---|---|
| RAM (313X) | 1.0 | 0 | 72 | 8. | 7. | 6.7 |
| HRAM (317X) | 1.0 | 18. | 72 | 258 | 139 | 108. |
| HPAM (316X) | 0 | 18. | 72 | 523 | 215 | 153. |
| PAM (310X) | 0 | 0 | 72 | 3.1 | 3.1 | 3.1 |

[1]2,000 ppm polymer solutions in deionized water measured by the du Nouy method described in ASTM D1131-56.
[2]Solution viscosity measured at the shear rates indicated.

TABLE II

FOAM FORMING TENDENCIES

| Polymer Type | % C8AM | Percent Hydrolysis | Conc. Weight %[1] | Temp (°C.) | Foam Height[2] (mm) |
|---|---|---|---|---|---|
| RAM (313x) | 1.0 | 0 | 0.01 | 25, 49 | 3, 6 |
| | | | 0.04 | 25, 49 | 16, 15 |
| | | | 0.10 | 25, 49 | 35, 34 |
| | | | 0.20 | 25, 49 | 48, 63 |
| HRAM (317x) | 1.0 | 18. | 0.01 | 25, 49 | 0, 0 |
| | | | 0.04 | 25, 49 | 8, 9 |
| | | | 0.10 | 25, 49 | 14, 27 |
| | | | 0.20 | 25, 49 | 15, 33 |
| HPAM (316x) | 0 | 18. | 0.01 | 49 | 0 |
| | | | 0.04 | 49 | 0 |
| | | | 0.10 | 49 | 0 |
| | | | 0.20 | 49 | 0.5 |
| PAM (310x) | 0 | 0 | 0.20 | 49 | 0 |

[1]Concentration in deionized water.
[2]Ross-Miles Test, ASTM D1175-53

TABLE III

Effect of Salinity on Foam Forming Tendencies

| Polymer Type | Concentration[1] Wt. % | Salinity[2] Wt. % NaCl | Foam Height[3] (mm) |
|---|---|---|---|
| RAM (313X) | 0.01 | 0, 2 | 6, 17 |
| | 0.04 | 0, 2 | 15, 34 |
| | 0.10 | 0, 2 | 34, 60 |
| | 0.20 | 0, 2 | 63, 54 |
| HRAM (317X) | 0.01 | 0, 2 | 0, 15 |
| | 0.04 | 0, 2 | 9, 31 |
| | 0.10 | 0, 2 | 27, 54 |
| | 0.20 | 0, 2 | 33, 57 |

[1]Concentration in deionized water or brine.
[2]Concentration of sodium chloride in deionized water.
[3]Ross-Miles Test, ASTM D1175-53 conducted at 49° C.

TABLE IV

PERSISTENCE OF FOAMS

| Additive Type | Normalized Foam, Volume Percent | |
|---|---|---|
| | 5 Minutes | 30 Minutes |
| RAM (313x) | 91 | 75 |
| HRAM (317x) | 89 | 77 |
| ALIPAL CD-188 | 23 | 14 |
| NEODOL 25-9 | 29 | 1.5 |

TABLE V

Foam Volume for Various Polymers at Two Time Intervals

| Polymer | Mole % C8AM | SDS Polymer g/g | Foam Volume 30 s | 300 s | Comments |
|---|---|---|---|---|---|
| PAM #1 | 0.0 | <0.001 | 0.0 ml | 0.0 ml | No SDS in synthesis |
| PAM #2 | 0.0 | — | 0.0 | 0.0 | 3% SDS in synthesis |
| HPAM | 0.0 | — | 0.0 | 0.0 | Dow Pusher 700 |
| RAM-1 | 0.25 | 0.004 | 144 | 124 | 3% SDS in synthesis |
| RAM-2 | 0.50 | 0.003 | 140 | 120 | 3% SDS in synthesis |
| RAM-3 | 0.75 | — | 144 | 124 | 3% SDS in synthesis |
| RAM-4 | 1.0 | — | 140 | 130 | 3% SDS in |

TABLE V-continued

Foam Volume for Various Polymers at Two Time Intervals

| Polymer | Mole % C8AM | SDS Polymer g/g | Foam Volume 30 s | Foam Volume 300 s | Comments |
|---|---|---|---|---|---|
| | | | | | synthesis |

TABLE VI

Foam Volume for Various Water Soluble Polymers

| Polymer | Molecular Weight | Foam Volume 30 s | Foam Volume 300 s | Source of Polymer |
|---|---|---|---|---|
| Polyacrylic Acid | 100,000 | 0 ml | 0 ml | Rohm and Haas |
| Polyvinyl- pyrrolidone | 40,000 | 0 | 0 | Polysciences |
| Polyethylene Oxide | 3,300 | 0 | 0 | Union Carbide |
| Sodium Polystyrene Sulfonate | 127,000 | 0 | 0 | Procter Chem. |
| Xanthan | 6,000,000 | 0 | 0 | Kelco (Xanthan) |
| Scleroglucan | 6,000,000 | 55 | 0 | Jetco Chemical |

What is claimed is:

1. A process for forming a foamed polymeric aqueous solution which comprises the steps of:

(a) dissolving about 0.01 to about 5.0 parts by weight of a copolymer in 100 parts of weight of said water to form a solution, said copolymer having the formula:

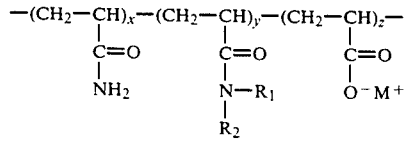

wherein $R_1$, having about 6 to 22 carbons, is an alkyl group, straight chained or branched or cyclo-alkyl group; $R_2$ is the same or different alkyl group as $R_1$ or hydrogen; x is about 50.0 to about 99.0 mole percent; and y is about 10 to about 0.1 mole percent; z is about 0.0 to about 50.0 mole percent; and $M^+$ is an alkali metal or ammonium cation;

(b) mixing said solution of said water and said copolymer with said gas under sufficient agitation conditions, at a sufficient temperature for a sufficient time to form said foamed polymeric aqueous solution.

2. A process according to claim 1 wherein R is an alkyl group having about 6 to about 18 carbon atoms.

3. A process according to claim 1 wherein x is 84.0 mole percent; y is 1.0 mole percent; and z is 15.0 mole percent.

4. A process according to claim 1 wherein x is about 90.0 to about 99.9 mole percent; y is about 0.1 to about 10.0 mole percent; and z is less than 0.5 mole percent.

5. A process according to claim 1 wherein the oil soluble monomer of the copolymer is dodecylacrylamide.

6. A process according to claim 1 wherein the oil soluble monomer of the copolymer is octylacrylamide.

7. A solution according to claim 1 wherein the oil soluble monomer of the copolymer is hexylacrylamide.

8. A process according to claim 1 wherein the oil soluble monomer of the copolymer is decylacrylamide.

9. A process according to claim 1 wherein $M^+$ is sodium, potassium or ammonium.

10. A process according to claim 1 wherein said water is salt water.

11. A process according to claim 1 wherein the gas is selected from the group consisting of air, nitrogen, carbon dioxide, methane, ethane, propane and freon and mixtures thereof.

* * * * *